US010424413B2

United States Patent
Martynov et al.

(10) Patent No.: US 10,424,413 B2
(45) Date of Patent: Sep. 24, 2019

(54) METHOD AND CONTROL SYSTEM FOR GAS INJECTION INTO COOLANT AND NUCLEAR REACTOR PLANT

(71) Applicant: JOINT STOCK COMPANY "AKME-ENGINEERING", Moscow (RU)

(72) Inventors: Petr Nikiforovich Martynov, g. Obninsk (RU); Konstantin Dmitrievich Ivanov, g. Obninsk (RU); Radomir Shamil'evich Askhadullin, g. Obninsk (RU); Aleksey Nikolaevich Storozhenko, g. Obninsk (RU); Alexander Yurievich Legkih, g. Obninsk (RU); Vladimir Vladimirovich Ul'Yanov, g. Obninsk (RU); Stepan Artemovich Borovitsky, Moscow (RU); Alexandr Ivanovich Filin, Moscow (RU); Sergey Victorovich Bylavkin, Moscow (RU)

(73) Assignee: JOINT STOCK COMPANY "AKME-ENGINEERING" (RU)

( * ) Notice: Subject to any disclaimer, the term of this patent is extended or adjusted under 35 U.S.C. 154(b) by 197 days.

(21) Appl. No.: 15/526,129

(22) PCT Filed: Nov. 6, 2015

(86) PCT No.: PCT/RU2015/000742
§ 371 (c)(1),
(2) Date: May 11, 2017

(87) PCT Pub. No.: WO2016/076756
PCT Pub. Date: May 19, 2016

(65) Prior Publication Data
US 2017/0309353 A1    Oct. 26, 2017

(30) Foreign Application Priority Data

Nov. 11, 2014   (RU) ................................ 2014145266

(51) Int. Cl.
*G21C 15/00*         (2006.01)
*C23F 11/02*         (2006.01)
(Continued)

(52) U.S. Cl.
CPC .............. *G21C 15/00* (2013.01); *C23F 11/00* (2013.01); *C23F 11/02* (2013.01); *G21C 15/28* (2013.01);
(Continued)

(58) Field of Classification Search
CPC .... G21C 15/00; G21C 15/28; G21C 17/0225; G21C 19/28; C23F 11/00; C23F 11/02
(Continued)

(56) References Cited

U.S. PATENT DOCUMENTS 3,784,443 A * 1/1974 Vercasson ................ G21C 1/03
                                                  376/247
4,259,152 A * 3/1981 Pennell ................... G21C 17/00
                                                  376/250

FOREIGN PATENT DOCUMENTS

| EP | 1078376 | 11/2007 |
|---|---|---|
| RU | 2226010 | 3/2004 |
| RU | 2247435 | 2/2005 |

* cited by examiner

*Primary Examiner* — Jack W Keith
*Assistant Examiner* — Daniel Wasil
(74) *Attorney, Agent, or Firm* — Colin P. Cahoon; Shaukat A. Karjeker; Carstens & Cahoon, LLP

(57) ABSTRACT

A nuclear reactor plant including a reactor; a coolant in the reactor; a gas system connected to the reactor and adapted to provide a gas supply to and gas removal from a space above the coolant; and a device for injection of gas into the coolant.

(Continued)

The device is installed partially in the coolant and partially in the space above the coolant, and is adapted to supply gas from the space above the coolant to the coolant. The gas system and device are configured to carry out steps including: supplying gas to be injected into the coolant from the gas system to the space above the coolant space; injecting gas into the coolant by maintaining the gas pressure higher than coolant pressure in the device; and injecting gas into the gas system from the space above the coolant.

3 Claims, 4 Drawing Sheets

(51) Int. Cl.
  *G21C 15/28* (2006.01)
  *C23F 11/00* (2006.01)
  *G21C 17/022* (2006.01)
  *G21C 19/28* (2006.01)
  *G21C 19/303* (2006.01)
(52) U.S. Cl.
  CPC ......... *G21C 17/0225* (2013.01); *G21C 19/28* (2013.01); *G21C 19/303* (2013.01)
(58) Field of Classification Search
  USPC ........................................................ 376/306
  See application file for complete search history.

METHOD AND CONTROL SYSTEM FOR GAS INJECTION INTO COOLANT AND NUCLEAR REACTOR PLANT

FIELD OF THE INVENTION

The invention relates to nuclear power industry and nuclear reactor plants, and more particularly to nuclear reactor plants with liquid-metal coolants. At the same time, this invention may also be applied to various non-nuclear reactor plants.

BACKGROUND OF THE INVENTION

One of the key problems of nuclear reactor plants with liquid-metal coolants is corrosion of reactor structural materials. To prevent corrosion, the technique for formation of protective oxide coatings is used. The corrosion resistance of reactor structural materials, for example, steel, depends on the integrity of these coatings.

It should be noted that the mentioned problem may occur both in nuclear reactor plants with non-liquid-metal coolants and in non-nuclear reactor plants. Although, this invention is described in relation to nuclear reactor plants with liquid-metal coolants, it also can be used both in nuclear reactor plants with non-liquid-metal coolants and in non-nuclear reactor plants.

Oxygen can be applied for the purpose of formation of oxide coatings. Patent RU2246561 (issued on Feb. 20, 2005) discloses the method for increasing the oxygen concentration in the coolant by way of injecting the oxygen gas directly into the coolant, or supplying oxygen to the coolant surface, for example, into the gas chamber close to the coolant—in the latter case oxygen penetrates the coolant by way of infusion. Due to the fact that iron, chrome, and other components of structural materials have higher chemical affinity for oxygen, than coolant components, such as lead and/or bismuth, oxygen, inserted into the liquid metal coolant in the form of oxides of the coolant components, will oxidize components of structural materials and, at adequate oxygen concentration, will form protective oxide coatings on the surface of reactor walls. To ensure this kind of effect, oxygen concentration in the coolant is to be maintained within specified limits which depend on the reactor design and structural materials, as well as on the type and composition of coolant.

Besides oxygen the other gases may be injected into the coolant. One of the disadvantages of such method is that gas injection into the coolant results in formation of bubbles floating to the coolant surface and gas from these bubbles enters the above-coolant space. While being in the coolant the dust, solidphase particles and components dissolved in the coolant may penetrate the gas bubbles. Therefore, gas injected into the coolant becomes contaminated by dust, solidphase particles and components after staying in the coolant and entering above-coolant space. Reuse of such gas, in particular, its reinjection into the coolant, results in contamination of the coolant and reactor equipment and, therefore, causes equipment faults and reduction of operating life of the equipment and reactor as a whole.

Invention Disclosure

The purpose of this invention is to provide the method and control system for gas injection into coolant and reactor plant, which are free from disadvantages intrinsic to the background of the invention. In particular, it is necessary to prevent contamination of the reactor coolant, vessel and equipment due to presence in the above-coolant space and reuse of the gas that was previously injected into the coolant and contaminated therein, while providing the possibility of gas reuse.

The purpose of this invention is achieved by using the method of gas injection into the reactor coolant. The reactor is connected to the gas system and comprises device intended for injection of gas into the coolant installed partially in the coolant and partially in the above-coolant space and adapted to gas supply from the above-coolant space to the coolant. The gas system is connected to the reactor and adapted to gas supply/removal to/from the above-coolant space.

The method includes the following steps: gas to be injected into the coolant is supplied from the gas system to the above-coolant space; gas is injected into the coolant by maintaining the gas pressure higher than coolant pressure in the device intended for injection of gas into the coolant; gas is injected into the gas system from the above-coolant space.

In one of the possible embodiments of invention, gas is continuously supplied to the above-coolant space from the gas system and is continuously removed from the above-coolant space to the gas system during the gas injection into the coolant. In another possible embodiment of invention, gas is injected into the coolant for not longer than it is required for gas injected into the coolant to reach the coolant surface.

Gas removed from the above-coolant space to the gas system is preferably filtrated and reinjected into the above-coolant space. In some embodiments, gas pressure in the device intended for injection of gas into the coolant is maintained higher than the coolant pressure by increasing gas pressure in the near-coolant space. In other embodiments, gas pressure in the device intended for injection of gas into the coolant is maintained higher than the coolant pressure by local reduction of the coolant pressure near the device intended for injection by rotating at least part of the device intended for injection of gas into the coolant.

The purpose of this invention is also achieved by using the control system for gas injection into the reactor coolant. The reactor is connected to the gas system and comprises device intended for injection of gas into the coolant installed partially in the coolant and partially in the above-coolant space and adapted to gas supply from the above-coolant space to the coolant. The gas system is connected to the reactor and adapted to gas supply/removal to/from the above-coolant space ensured.

Control system includes the following: control modulus of the gas system adapted to control the gas system ensuring gas supply to the above-coolant space of the reactor and ensuring gas removal from the above-coolant space of the reactor; and control modulus of the device intended for injection of gas into the coolant adapted to control the device intended for injection of gas into the coolant ensuring gas injection from the above-coolant space into the coolant.

In some embodiments, control modulus of the gas system may be adapted to ensure continuous gas supply to the above-coolant space and/or continuous gas removal from the above-coolant space. In other embodiments, the system may include timer and the control modulus of the device intended for injection of gas into the coolant may be adapted to ensure gas injection into the coolant for not longer than it is required for gas injected into the coolant to reach the coolant surface.

The purpose of this invention is also achieved by using the nuclear reactor plant which includes: a reactor, a coolant located in the reactor, a gas system connected to reactor and adapted to supply and remove gas to/from the above-coolant space and the device intended for injection of gas into the coolant installed partially in the coolant and partially in the above-coolant space and adapted to gas supply from the above-coolant space to the coolant. The gas system and device intended for injection of gas into the coolant are adapted to function in compliance with the method for any of the embodiments described above and/or under control of the system for any of the embodiments described above.

In the preferable embodiment, the gas system comprises pipes, gas filter and pump connected into the loop, origin of which is adapted to receive gas from the above-coolant space of the reactor and end of which is adapted to supply gas to the above-coolant space of the reactor.

The present invention provides the method and device (system) for control of gas injection into the coolant and reactor plant, which are free from disadvantages intrinsic to the background of the invention. Such technical result as prevention of contamination of the reactor coolant, vessel and equipment is accomplished. In particular, removal of gas contaminated while being in the coolant from the above-coolant space is ensured by way of airing of this space, which allows to improve safety, reliability, and extend the operating life of the reactor plant.

EMBODIMENT OF INVENTION

Figure 1:
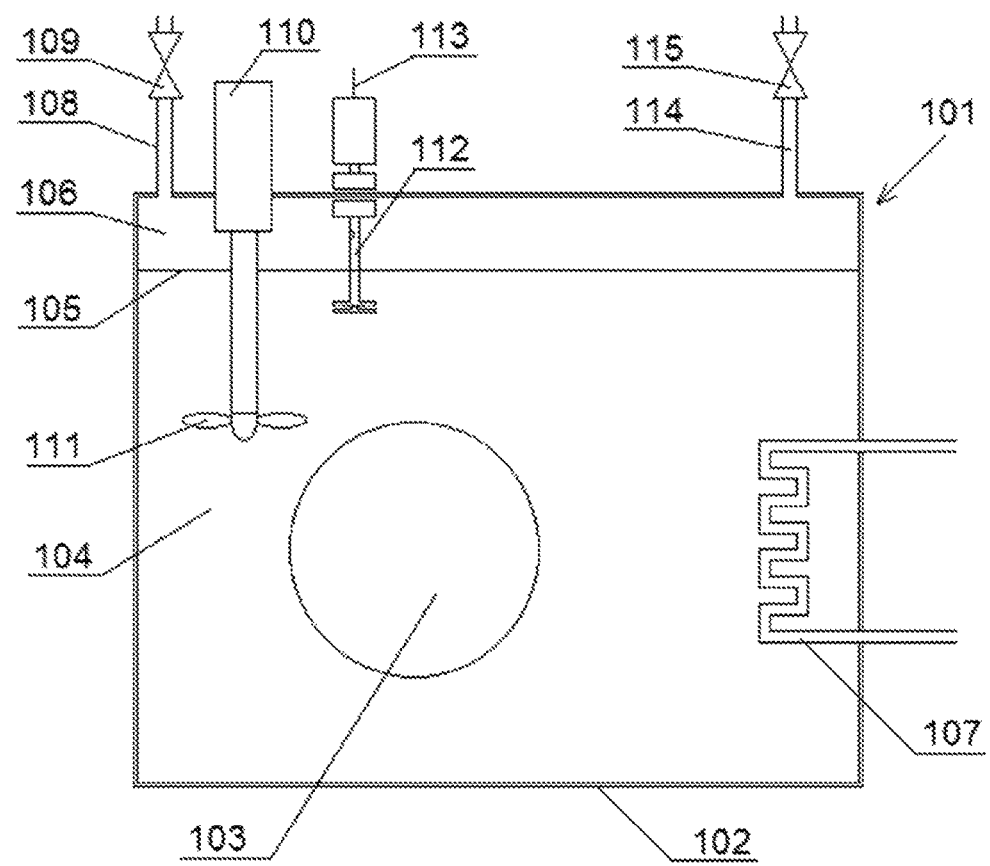
FIG. 1 shows a schematic view of reactor plant in accordance with this invention.

This invention applies to a reactor plant (for example, nuclear reactor plant) which includes, as per one of the examples in FIG. 1, reactor 101 that comprises coolant 104 connected with the gas system by means of pipes 108 and 114 that are equipped with isolation valves 109 and 115 respectively. Besides, reactor may also include circulation pump 110 with an impelling propeller 111, disperser 112 with power and control terminal 113.

A reactor 101 is a tank, the walls 102 of which are made of structural materials with adequate mechanical, thermal, radiation and other types of durability necessary for safe operation of a reactor plant, such as steel. Safe operation of reactor plants is of particular importance due to the fact that the core 103 of reactor 101 contains radioactive materials which release energy in the course of radioactive fission. At least a certain quantum of this energy in the form of heat is transferred to the coolant 104 located in the reactor and contacting with the core (i.e. the radioactive materials are located primarily in the coolant), and further transported to the heat exchanger 107 where the heat energy is transferred to other materials (for example, water, steam and other heat-absorptive materials), at a distance from the radiation source. In some embodiments of the invention the heat exchanger can be a steam generator designed to generate steam which can be used for heating of other media or activation of turbines. Downstream of the heat exchanger 107, the heat energy is transferred through the utilities outside the reactor without hazard of radiation contamination which, therefore, is concentrated within the reactor. In connection to this, due to drastic, undesired and long-term effects of radiation contamination of surrounding areas the special emphasis is placed on the strength and safe operation of the reactor. It is preferable to circulate the coolant in the reactor 101, in the circuit covering the core and the heat exchanger, for long-term and efficient transfer of heat from the core 103 to the heat exchanger 107 of the reactor. In order to ensure circulation the pump 110 with impelling propeller is preferably used.

One of the important factors to retain strength of the reactor 101 through time is prevention or mitigation of corrosion of structural materials of reactor walls 102, its reinforcing, fixture, strength and other elements to the admissible level. The mentioned factor must also be considered when a coolant consisting of liquid metals such as sodium, lithium, lead, bismuth and etc. is used as the coolant 104. Heavy metals (lead, bismuth) have an advantage over light-weight metals because of their increased safety, particularly, in terms of low fire hazard.

Besides, the coolants made of heavy metals have such an advantage as stability of their properties in case of water ingress. Naturally, the physical and chemical properties of such coolant will change in case of water ingress, but such changes will be insignificant and allow further operation. This can be useful for improving safety of a reactor plant in view of possible accidents or leakages of equipment where water is present or flows in the liquid form or in the form of steam, for example, heat exchangers or steam generators. Even if a heat exchanger or steam generator is faulty (have a leakage), the reactor plant can be operated until repair or replacement of faulty (leaking) equipment, as the coolant made of heavy metals allows such operation mode due to the insignificant (uncritical) dependence of its physical and chemical properties on injection of liquid or vaporous water.

In order to reduce corrosion action on structural materials of the reactor, it is considered advantageous to create oxide coatings on the boundary between the coolant and structural material, for example, by supplying oxygen to the coolant surface (with subsequent infusion of oxygen into the coolant) or into the coolant; upon that the oxygen can be transferred by the coolant towards the reactor walls where oxygen can react with the structural materials (for example, steel) and form an oxide in the form of oxide coating on the surface of the structural material. An additional advantage of such anticorrosion protection is reduction of heat-exchange rate between the coolant and reactor walls due to low thermal conductivity of oxides. Injection of oxygen into the coolant and increase of oxygen concentration can be provided by means of supply of oxygen gas or oxygen-bearing gas from the gas system into the reactor to the near-coolant space and/or their injection into the coolant.

If oxygen concentration value in coolant is too high, it may cause oxygen-type corrosion of structural materials, which leads to reduction of the reactor operating period, formation of a coolant leakage risk, excessive accumulation of solid-phase deposits in the coolant, etc. To reduce excessive oxygen concentration in the coolant, which could be caused by, for example, reactor depressurization and penetration of atmospheric air therein, or by scheduled maintenance, which resulted in excessive increase of oxygen concentration in the coolant, or to ensure coolant purification, it is allowed to use hydrogen gas or hydrogen-containing gas, supplied to the near-coolant space or injected into the coolant. When hydrogen gas is injected into the coolant, oxygen concentration in the coolant is reduced due to interaction of hydrogen with oxygen in the coolant and/or recovery of oxides of the coolant components. Reduction of excessive oxygen concentration in the coolant is a process important to reactor safety since extremely high oxygen concentration leads to the hazard of oxygen corrosion of reactor walls.

Oxygen or hydrogen can be injected in the pure state or as a gas mixture, for example, mixtures with inert gases, neutral gases, with moisture vapor or other gases. Furthermore, in some cases it is required to inject gases, which do not contain oxygen or hydrogen, but which consist, for example, of inert gases only (for example, for flotation cleaning of reactor internal surfaces).

Three-stage circuit can be used for gas injection into the coolant. At the first stage oxygen or hydrogen (or other gas) can be injected into the near-coolant space by means of the gas system, being the part of the reactor plant, with an outlet to reactor 101 space 106 above coolant 104 by means of pipe 108. Coolant 104 occupies only a part of the reactor tank to reduce the hazard of reactor depressurization due to thermal expansion of the coolant during heating. Upper part 106 of the reactor tank located above surface 105 ("level") of coolant 104 is usually filled with inert gas (He, Ne, Ar) or a mixture of inert gases to prevent corrosion and undesired chemical reactions. To supply gas to the reactor (into the near-coolant space, as shown in FIG. 1) there is pipe 108 of the gas system. Furthermore, the gas system contains pipe 114, equipped with breather 115, for gas outlet from the reactor into the gas system. The purpose of pipes (pipelines) 108 and 114 is gas supply into or outlet from the reactor (is interchangeable). Furthermore, the reactor plant may be provided with other pipes (pipelines) for supply/outlet of gas from the reactor.

Figure 2:
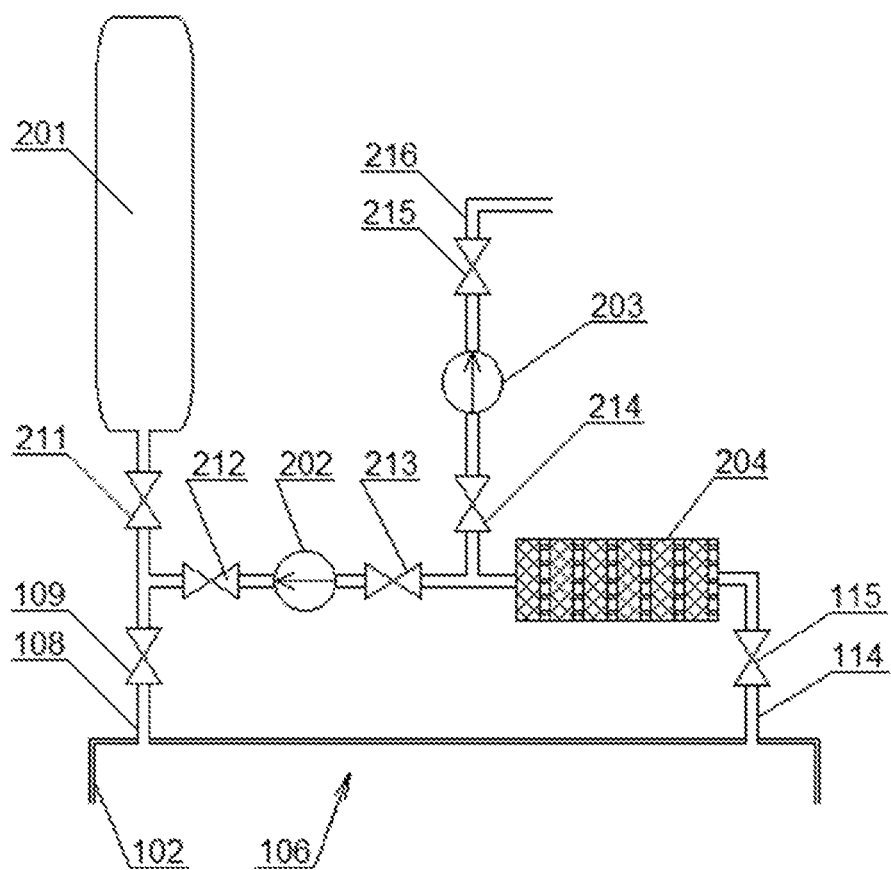
FIG. 2 shows a possible embodiment of the gas system.

The gas system, detailed in FIG. 2, can include pipelines (pipes) 108, 114, 216 and other, mixers/distributors, isolation valves 109, 114, 211-215 (breathers, valves, etc.), filter 204, pumps 202 and 203 and other equipment, not shown in FIG. 2, commonly used in gas systems and known from the background of the invention. The gas system can be connected with source 201 or a variety of gas sources or include them respectively, and can perform gas mixing by means of mixers and/or distribute gas or gas mixture by means of distributors, the function of which can be performed by the mixers themselves. Gas supply from the source to the gas system is controlled by isolation valves 211.

The gas sources intended for supply to the reactor or for use in the gas system can be represented by facilities for gas generation and purification, for example, facilities for water electrolysis into oxygen and hydrogen. Gas main lines or gas cylinders or cylinder systems, which contain compressed gas, can also be the sources. Gas supply can be performed by means of high pressure inside the gas cylinders or by pumps provided for gas supply from the capacitors wherein the gas is stored. FIG. 2 outlines gas cylinder 201 that contains high pressure high-purity gas. At outlet from the sources or inside them gas filters can be provided, intended for gas purification from particles of various sizes, which without the filters would damage the gas system and/or the reactor, and lead to gas and/or coolant contamination.

In order to control the movement of the gases though the pipes, pipelines, mixers/distributors and different equipment of the gas system there are isolation valves 109,115,211-215. Isolation valves can be presented by breathers, valves, switches, cocks, gate valves, shutoffs and other types of equipment that can be used for fluid/gas flow control. Primarily isolation valves are adapted to provide remote control, for example, by means of electric, hydraulic, lever drives and other types of drives. Remote control ensures safety of the personnel performing reactor services, scheduled maintenance or operation. Furthermore, remote control allows for control of a great number of isolation valves from one place, for example, from a panel, thus allowing for monitoring the whole condition and faster response to the changing state, making it possible to carry out a range of operations, which require performance of complex operation mode sequences, and improving reactor safety in general.

Mixers/distributors are presented by a connection of several pipes/pipelines, through which various gases can be supplied for mixing and/or distribution into various pipes/pipelines and various equipment. For example, mixers/distributors can be represented by pipe connections, passing between valves 109, 211, 212 or between valves 213, 214 and filter 204, shown in FIG. 2. Mixing can be performed either directly in place of pipe/pipeline connection due to high diffusibility of gases and ability to penetrate each other and mix, or in a capacitor specially intended for mixing, to which pipes/pipelines are connected. The result of gas mixing can be transported by one or more pipes/pipelines, i.e. transported to one destination point or distributed into several destination points. Furthermore, the same gas can be led from one or several pipelines and supplied to several pipelines, which transport the gas to relevant consumers or destination points—in such case the gas is distributed. In some cases mixer/distributor can operate in the mode of a common pipe/pipeline, wherein the gas is supplied into one pipe and removed from the other.

The operation mode of gas system in controlled by means of isolation valves, the state of which (open/closed, flow rate, etc.) determines the direction of gas flow. For example, for gas supply from source 201 to pipe 108, and therefore into above-coolant space 106, with an outlet to the above-coolant space through wall 102 of the reactor, breathers 211 and 109 are opened, and breather 212 must be closed.

In case when gas removal from above-coolant space is impossible, i.e. if breather 115 is closed or breathers 213 and 214 are closed, gas will be transported to the reactor to the above-coolant space till it is equal to gas pressure in the source or till it is equal to pressure that can be created by a force pump, if such is used for gas supply to the reactor.

Alternatively, if gas removal from above-coolant space is possible, i.e. if breathers 115, 214 and 215 are open, and breathers 212 and 213 are closed, then the gas, supplied from source 201 to the reactor into the above-coolant space by means of pipe 108, will be removed from the above-coolant space into the gas system through pipe 114. Then the gas will pass through filter 204, being purified from contamination, and will be removed into the atmosphere or space intended for storage (for example, spent gas storage) through pipe 216. In such case the ventilation of the above-coolant space will be performed.

Above-coolant space ventilation is also possible without supply of gas from source 201. Gas system loop that contains filter 204 and pump 202 can be used for this purpose. In order to arrange a loop in the gas system it is necessary to open breathers 109, 115, 212 and 213, and close breathers 211 and 214. When activating (switching on) pump 202 the gas system loop sucks the gas in from above-coolant space 106 through pipe 114, the gas passes through filter 204 and pump 202 and is resupplied to space 106 through pipe 108. If pump 202 is capable to supply gas in opposite direction, then gas will be removed from space 106 through pipe 105, and reenter space 106 through pipe 114. However, in such case contamination by small particles, suspension and/or dust of pump 202 is possible, since gas filtration is performed after gas passes the pump. Therefore a preferred option of gas circulation arrangement in space 106 and gas loop is the option, where at first gas passes through filter 204 and then through pump 202, since in such case the risk of pump contamination is reduced and its lifetime is extended without the need for repair. Gas circulation in the space and in the gas loop with such configuration allows filtering gas in space 106 and ensuring the required degree of purity depending on filter 204. As a result, the above-coolant space is vented with pure gas without gas consumption from external sources.

Filter 204 is a device that allows for breathing and retention of dust, solidphase and/or liquid and/or jelly-like particles and other gas contaminating impurities. The filter may contain fibrous materials, such as fiber glass, fiber felt, etc. which ensure retention of impurities. It is also possible to use various screens, gauzes etc. Furthermore, the filter may contain, be coupled with or designed as centrifugal or gravitational dust collectors for example, in the form of a cyclone filter. Furthermore, the filter may contain be coupled with or designed as a cooler, that allows for gas purification from air steam by means of their cooling and turning into water while the purified gas is removed from the filter.

In some configurations cases of above-coolant ventilation are possible, where gas is removed from the above-coolant space by means of a pump, placed in the discharge pipe (preferably downstream of filter) and is vented to atmosphere or spent gas storage or processing equipment. In FIG. 2 pump 203, that removes gas from space 106 through pipe 114 and filter 204 and supplies it to the discharge pipe can be used as such equipment. In order to provide such configuration it is required that breathers 115, 214 and 215 are open, and breather 213 is closed. In such case there is no need to supply any gas to the above-coolant space by means of any gas source. It is sufficient to provide connection of intake pipe with the gas storage or atmosphere, and the gas from the storage will be sucked into above-coolant space (preferably through a filter) by means of gas rarefaction (decreased pressure) in above-coolant space, created for example by output pump. In gas system option shown in FIG. 2, there is no pipe, that would allow for connection with atmosphere or gas storage not by means of a pump and not with high pressure gas source and would have connection with the above-coolant space, however in other embodiments such pipes and their connections with atmosphere or gas sources can be provided.

In the above configurations of gas system the above-coolant space ventilation is provided in several ways. Firstly, gas from the gas source can be supplied to the above-coolant space through a feed pipe or under pump head, passing through the above-coolant space and independently be transported to the pipe for removal from the space. Secondly, gas can be removed from the space through an outlet pipe by means of an extraction pump, independently flowing into space from inlet pipe and passing through the above-coolant space to the outlet hole. Thirdly, there is a combined version, in which gas is simultaneously supplied to the above-coolant space through a feed pipe (by means of a pump and/or from the gas source) and is removed from the space through an outlet pipe by means of a pump. There is also an option where a pump same as pump 202 in the loop configuration, performs gas removal from the space and supplies the gas to the space again. All the versions of configuration provide for ventilation of the above-coolant space by means of supply and/or removal of gas into/from the above-coolant space.

After gas was injected into the above-coolant space, the second stage of injection of gas into the coolant is realized, which is injection of gas directly into the coolant from the above-coolant space. To inject gas into the coolant, the reactor is equipped with a device intended for injection of gas into the coolant. The device is installed partially in the coolant and partially in the above-coolant space. The device makes it possible to supply gas from above-coolant space to the coolant through the holes of the device interconnected by channel. One hole is located in the above-coolant space, the other one is in the coolant. In one of the embodiments, the device can be a tube that has a channel inside which connects holes at the ends of the tube, while one end is located above the coolant and the other end is in the coolant. In another embodiment, a similar tube can be equipped with a pump that injects gas from the above-coolant space into the tube, and thereby into the coolant. Device intended for injection of gas into the coolant can be executed in the form of disperser, configuration and operation principle of which are described further below, or it can be a combination of these or other devices (as well as a different device) that make it possible to inject gas into the coolant.

Gas can be injected into the coolant, for instance, in two ways. The first way consists in creating increased pressure in the above-coolant space as compared to inside-the-coolant pressure (for instance, when the gas in the above-coolant space does not press on the whole of the surface of the coolant, and/or in case when the coolant can flow to space where there is no increased pressure which is created in the above-coolant space), that can cause forced penetration of gas into the coolant which has lower internal pressure than the device intended for injection of gas into the coolant. Pressure value can be determined by means of pressure sensors in this space or space connected to it with the gas system pipeline, or according to the amount of gas pumped to this gas space which can be determined with the use of flow rate meters. The disadvantage of this method consists in proneness of the device intended for injection of gas into the coolant to clog the outlet hole (holes) located in the coolant due to formation of coatings and solidphase particles or penetration of solidphase impurities, dust from gas over the coolant into the device intended for injection of gas into the coolant. To prevent clogging of disperser outlet holes, the hole is mainly done on the moving elements of the device intended for injection of gas into the coolant. These elements are installed in the coolant, for example, on the lower end of the rotating element of the device intended for injection of gas into the coolant.

The other way consists in creating a local zone of low pressure in the coolant, for example, near the device intended for injection of gas into the coolant (entrainment of gas with coolant). For instance, it can be done with the help of elements of the device intended for injection of gas into the coolant that rotate or move in the coolant. In one of the embodiments, this can be achieved with the use of discs in the lower part of the disperser which may have blades. When rotating, the discs create a low-pressure area in the coolant under the action of centrifugal forces. The gas passing from the above-coolant space to the lower holes near or in the discs through the longitudinal channel goes to the mentioned low-pressure area. Due to the gradient of coolant velocity near the device intended for injection of gas into the coolant (disperser, for instance), in particular, the discs, i.e. when the coolant near the disperser moves faster than in the area away from it, the gas entering the coolant in the form of bubbles is fragmented to smaller bubbles, thereby creating the finely-divided two-component suspension of gas-coolant. Due to the fact that the device intended for injection of gas into the coolant has moving (rotating) elements, the coolant moves (flows over) near the surfaces of the device intended for injection of gas into the coolant, which washes the solid particles and oxide coatings away from the device intended for injection of gas into the coolant, thereby ensuring its automatic self-purification. This property increases the operating life of the device intended for injection of gas into the coolant as well as the operating life and safety of operation of the reactor plant in general.

In individual embodiments of this invention intended for injection of gas into the coolant, the disperser 112 is installed in the function of the device intended for injection of gas into the coolant 104 from the space 106 above the coolant in the reactor 101. For this purpose, the disperser 112 is installed partially in the coolant 104 and partially in the space 106 near the coolant 104 Gas containing oxygen or hydrogen can be injected into the coolant directly from the gas system pipeline, but in this case the pipeline will be sunk in the coolant, which may lead to plugging and clogging of the pipeline, thereby affecting safety and decreasing the operating life of the reactor plant.

The disperser 112 is installed vertically, in this case the disperser 112 is set to position extending its operating life, as the coolant and the solid-phase oxides do not penetrate into the disperser (which would require that they move upwards) or cause its clogging, which extends its operating life. As the disperser is able to supply gas from the near-coolant space to the coolant, the gas entrained through the hole in the upper part of disperser located, in a particular case, in the above-coolant space passes through a channel in the disperser (for example, in the shaft) downward and comes out of its lower part located in the coolant (the names of directions change accordingly at other layouts of disperser).

Figure 3:
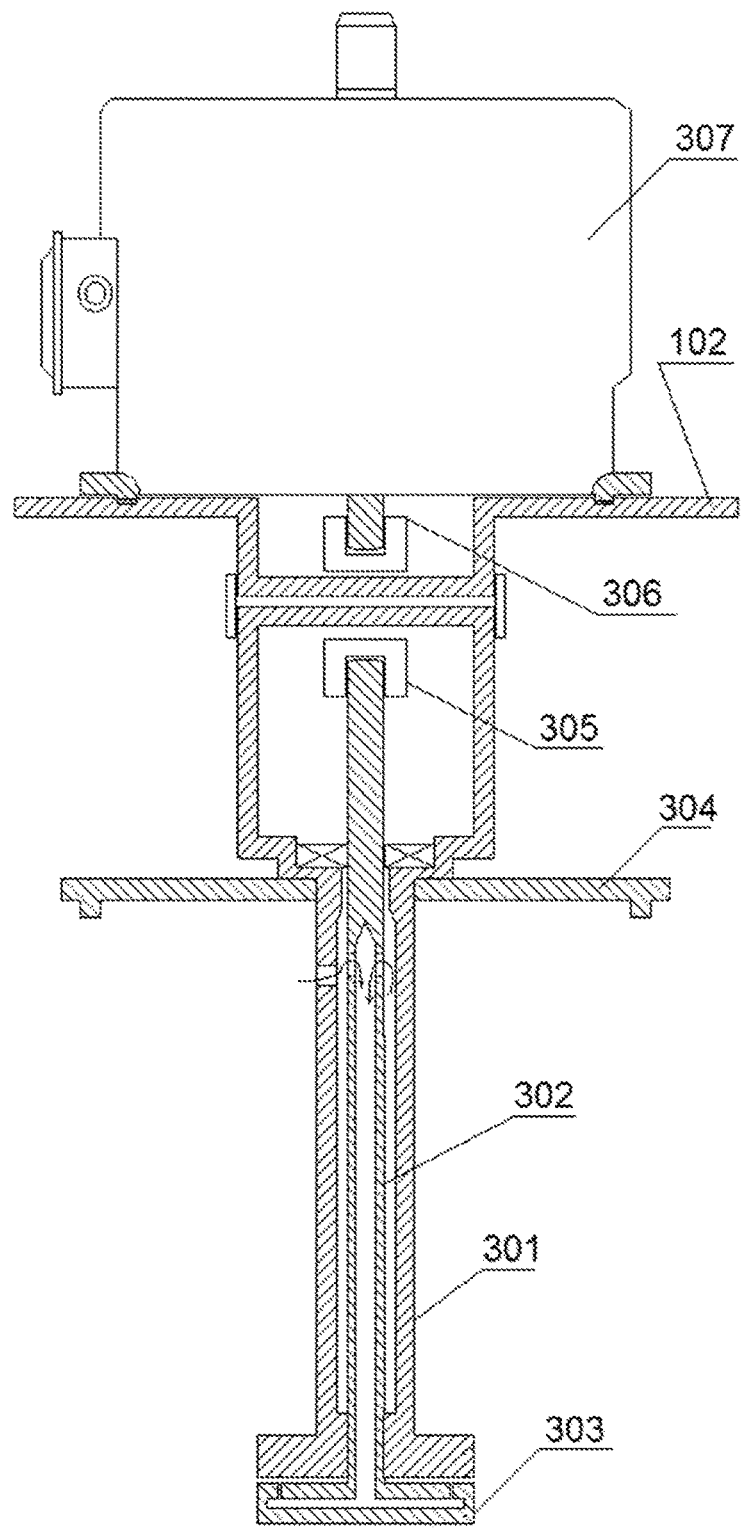
FIG. 3 shows an embodiment of disperser.

In the embodiment shown in FIG. 3 the disperser can have two discs, one of which rotates and another one does not. Such a combination creates a low-pressure area of the coolant between the discs; gas may get to this area from the holes in the shaft or in one or two discs. As it is possible to provide a sufficiently small distance between the discs, and one of the discs rotates relative to another, the pressure drops faster compared to the case when both discs rotate. As a result, the efficiency of gas injection into the coolant is improved and the gas bubbles become even smaller, i.e. the dissolution efficiency of gas in the coolant is improved.

The solid electrolyte oxygen sensor shown in FIG. 3 consists of the following main elements: the disperser housing 301 with a stationary upper disc; the hollow shaft 302 connected to the lower rotating disc 303; the flange 304 fastening the disperser to the reactor vessel; the electric motor 307 with the drive magnetic half-coupling 306 transferring rotation to the hollow shaft 302 with the use of a driven magnetic half-coupling 305. The electric motor 307 with the half-coupling 306 is installed on the outside of the reactor wall 102, and the half-coupling 305 is installed on the inside of the reactor wall 102.

In the preferable option shown in FIG. 3 the upper disc (stator) of the disperser is rigidly connected to the disperser housing 301. The lower rotating disc 303 is connected to the rotating shaft 302. The lower disc and the shaft are hollow, their cavities are interconnected. In the upper part the shaft cavity is connected to the gas circuit through holes. The holes of small diameter (at least 12 holes) are punched on the surface of the lower disc forming a clearance; these holes are located in a circumferential direction. The upper disc can also have small holes for injection of liquid metal into the cavity between the discs. In the upper part the rotating shaft is connected to the shaft of the sealed electric motor 307 powered from the frequency converter by means of magnetic half-couplings 305 and 306.

The disperser is immersed in the coolant so that the holes in the upper part of the shaft are above the liquid level, and the upper and lower discs are below the liquid level. When the sealed electric motor is run, the lower disc rotates with the prescribed angular velocity. As a result of coolant movement relative to the lower disc, a low-pressure area is formed in the clearance, which provokes the injection of gas into the clearance from the cavity of the lower disc through the holes in its upper part. Due to the velocity gradient of coolant the bubbles in the clearance are fragmented and the finely-divided gaseous phase together with the coolant comes from the clearance to the main flow of the coolant.

In other embodiments of the disperser, the lower disc can be stationary, and the upper disc can be a rotating one. Besides, the cavity connecting the near-coolant space and the hole in the disc can be placed both in the shaft and in the housing. The holes can be made both in the rotating disc and in stationary one (or both).

As mentioned above, the operation principle of the gas disperser is based on the fragmentation of gas bubbles in liquid upon being injected into the flow with high velocity gradient. Due to the irregularity of Q force applied to the surface elements, the large bubbles in such a flow are broken down into small ones. In the preferable option of the disperser, high-gradient flow of liquid in the gas disperser is formed in the clearance between rotating and stationary discs. The degree of gaseous phase dispersion with all other conditions being equal depends on velocity gradient in the flow. The velocity gradient is increased by reducing the clearance between the discs or increasing the linear speed of the discs' relative motion.

The injection of gas into the coolant can be regulated due to the capability of controlling gas system operation which can inject essential gas in the near-coolant space, and/or create increased pressure in the near-coolant space, as well as due to the capability of controlling disperser operation which does not inject gas into coolant from the above-coolant space in passive state (without rotation of discs), and injects oxygen-containing gas into the coolant from the above-coolant space in active state (with rotation of discs), and the rate (efficiency) of gas injection into coolant may depend on the disc rotation speed. Application of dispersers with rotating discs is more reasonable, because it does not require to create increased pressure to inject gas to the coolant from the near-coolant space, but it is sufficient to actuate (activate) the disperser, which simplifies and thereby enhances the reliability of control system operation.

To actuate ("activate") the disperser, it is required to rotate the shafts and discs (or one of the shafts and one of the discs). This may be done with the use, for example, of an electric motor. To reduce the destructive effect of high temperatures and vapors of the coolant on the electric motor and, consequently, to extend its operating life, the motor shall be located outside the reactor (although, in some embodiments it can be located inside). To rotate the disperser parts, the shaft may be passed through the reactor wall from the electric motor. For this purpose, the wall shall have an opening. However, to improve the reactor structural strength and thereby its operational safety, the preferable embodiment allows the rotation to be transferred from the electric motor to the disperser elements with the use of magnetic coupling the parts of which are installed opposite each other on the different sides of the reactor wall. The magnetic field formed by a magnetic half-coupling can transfer the rotary force to another half-coupling located on the other side of the reactor wall, thereby actuating the disperser. If the disperser motor is located outside the reactor, it can be controlled through a wire (cable) 113 shown in FIG. 1 designed for the supply of electric power to the electric motor by supplying or not supplying the power voltage or changing its parameters.

In this invention the actuation of disperser by means of an electric motor is designated as "activation" of the disperser and the shutdown of an electric motor when the disperser stops operating is designated as its "deactivation". Rotation speed of the electric motor can be controlled in different ways: in a binary way (cut-off/cut-in), at different rotation speeds or with a possibility to set any rotation speed within the specified range. Consequently, the higher rotation speed is, the more gas (including oxygen) is dissolved in the coolant and the smaller gas bubbles are formed.

As mentioned above, the gas (including oxygen-containing gas) can be injected into the coolant even when the increased gas pressure is created in the above-coolant space and the disperser is not activated. But in this case, the outlet hole (holes) of the disperser may be clogged. Therefore, to increase reliability and extend the operating life of reactor equipment (which leads to improving safety and reactor plant operating life extension), when applying this method of gas supply into the coolant (due to the increased pressure of the gas in the near-coolant space), the device intended for injection of gas into the coolant shall be activated in any case, so that the outlet hole (holes) at the lower end immersed in the coolant is flown around with the coolant which prevent accumulations of oxides, deposits, films etc. in/on it.

Furthermore, the very control of gas pressure in the near-coolant space performed in such a way that the gas penetrates into the coolant through a device intended for injection of gas into the coolant even without its activation, may be undesired due to formation of large-sized bubbles which, for example, are less effective at flotation cleaning of inner surfaces of reactor, and provide for much lower accuracy of gas concentration (e.g. oxygen or hydrogen) in the coolant due to less precision of pressure control in the gas system than the control of disperser rotation speed, and, consequently, local decrease of pressure in the coolant near the rotating end (discs) of the disperser; therefore, it is preferable to perform gas injection into the coolant with the use of an activated disperser.

After the gas is injected into the coolant in the form of bubbles, it will attempt to float to the surface as the density of the gas is much lower than the one of the coolant. The coolant is a liquid (in general, the invention may be used for air injection not only to the coolant, but to any other liquid) where bubbles can move. According to the Archimedes' principle, they will flow upwards, i.e. emerge.

In case the coolant is circulated in the reactor, i.e. the coolant is moving in a closed circuit, for example, by the action of a circulation pump such as pump 110, and coolant velocity is higher than the one of the bubbles in the coolant, the bubbles may be entrained by the coolant, move over the entire circuit and float to the surface of the coolant only when the volume of the coolant with the floating bubbles is close to the surface of the coolant in reactor (i.e. to the surface 105 of separation of two media: coolant 104 and gas 106 in the above-coolant space), or when the circulation stops.

In both cases at the movement of gas in the coolant such flow of bubbles cleans the surface of reactor walls of sediments, solidphase particles, dust, etc. Such sediments, solidphase particles and dust accumulate in gas bubbles and eventually are lifted out on the surface of the coolant from where they get into the gas in the above-coolant space. Such effect may be used for flotation cleaning of reactor structures exposed to the coolant (in such case inert gases, moisture vapor or gas mixtures, such as the mixture of inter gas with hydrogen and moisture vapor, may be injected). Due to the abovementioned phenomena, upon injection of gas in the form of bubbles into the coolant after a certain period of time defined by the rise rate of the bubbles and time of their circulation in the coolant, these gas bubbles filled with the above contaminants which may penetrate the bubbles not only from reactor walls but also from the coolant itself, float to the surface of the coolant, and the gas in the above-coolant space becomes contaminated with dust, solidphase particles, etc.

In the meantime injection of gas into the coolant may be continued. As the gas in the above-coolant space became contaminated, the coolant is injected with contaminated gas, and thus the coolant is not cleaned and contaminants may again be deposited on the walls and structures of reactor. Aside from that, due to the fact that the device intended for injection of gas into the coolant has a channel through which the gas is injected into the coolant, the flow of contaminated gas through this channel may result in clogging of the device and loss of its efficiency (capacity). Furthermore, as there is a high probability of formation of deposits and clogs at the output of the device intended for injection of gas into the coolant, that is near the hole at the end of the device submerged in the coolant, contaminated gas enhances such probability and tendency to contamination of outlet holes. In case a disperser with two discs rotating relative to one another is used as a device intended for injection of gas into the coolant, the space between the discs may also be contaminated reducing the capacity of the disperser and in extreme cases may knock it out of service and/or clog outlet holes.

All of this suggests that injection of contaminated gas into the coolant must be avoided. For this purpose, at the third stage after the gas is injected into the coolant, the contaminated gas is removed from the above-coolant space. Gas removal may be performed, for example, by means of an extraction pump removing the gas from reactor through the outlet pipe (usually there is a filter mounted at the front of the pump allowing filtering contaminants in the gas and prevent the pump from contamination which could knock it out of service or degrade its performance). In case the inlet pipe is open, the gas at the same time will be supplied (injected) to the above-coolant space. It can be either the purified gas from the atmosphere or pure gas storage, or the same gas which was removed from the above-coolant space and filtered. Gas may also be removed by supplying pure gas to the above-coolant space which will force the contaminated gas out through the open outlet pipe.

Due to the availability of the third stage, the contaminated gas is removed from the above-coolant space and replaced by pure (purified) gas; therefore, the coolant is injected with pure uncontaminated gas preventing deterioration of coolant characteristics and necessity of its replacement, protecting structures of reactor against corrosion by removing contaminants from its walls and preventing their origination, thus preventing contamination and clogging of the device intended for injection of gas into the coolant as well as extending its life and increasing operation time duration with no need of repair.

Figure 4:
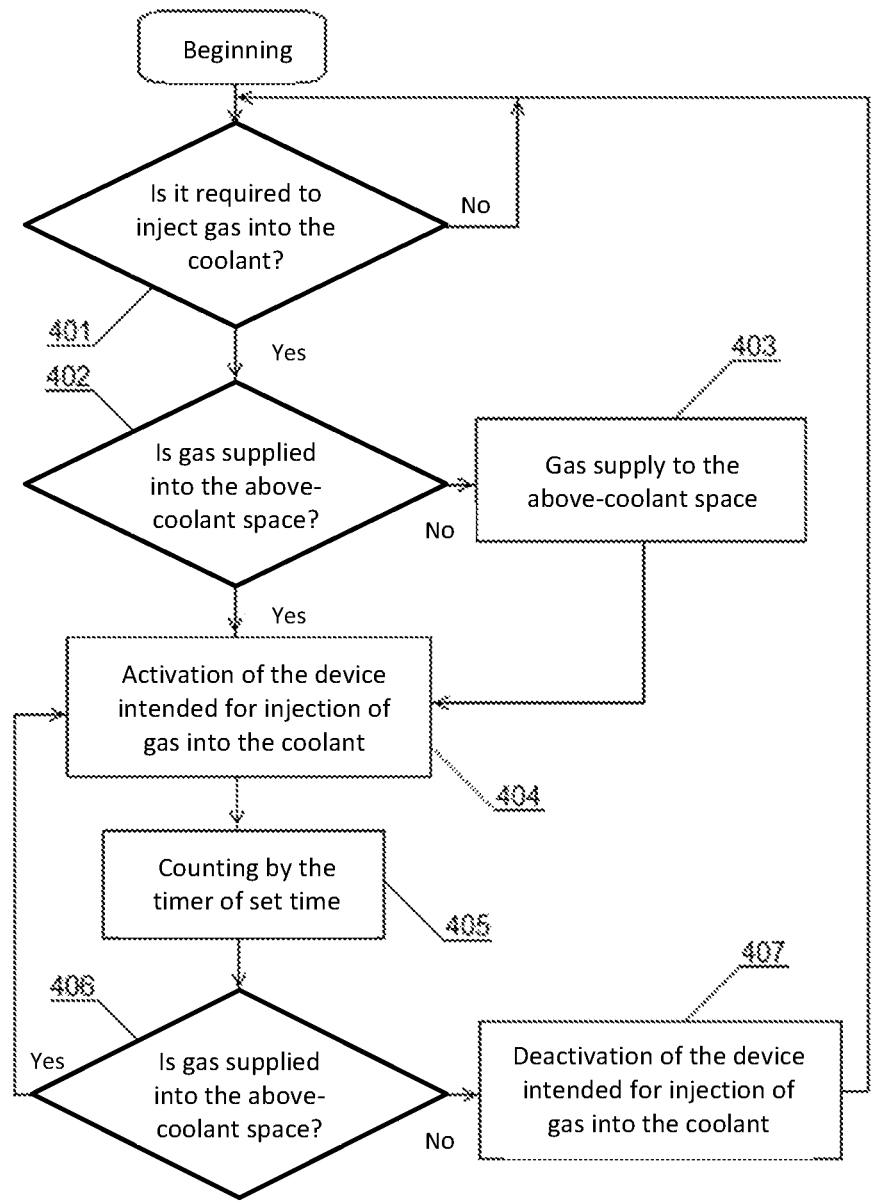
FIG. 4 shows an embodiment of the block scheme of the method for gas injection into the coolant.

At injection of gas into the coolant with the purpose of preventing injection of contaminated gas into the coolant, operation of reactor plant and, more specifically, of its gas system components and device intended for injection of gas into the coolant, may be performed, for example, in accordance with the method shown in FIG. 4. Gas supply control can be performed by means of a single control device or control system consisting of several modules.

In one embodiment, the control system for gas injection into the coolant may contain the module for control of the gas system and module for control of device intended for injection of gas into the coolant. The module for control of the gas system controls the gas system and, in particular, its equipment, pumps, valves, etc. so as to provide for supply of gas to the above-coolant space in the reactor or cutting-off of this supply as well as to ensure removal of gas from the above-coolant space of the reactor and cease of gas removal. With this purpose the module for control of the gas system is able to control the gas system in such a way so that its configurations provide for supply/removal of gas or their cease, for example, in accordance with configurations which refer to FIG. 2. Module for control of the device intended for injection of gas into the coolant controls the device intended for injection of gas into the coolant so as to ensure supply of gas from the above-coolant space to the coolant or cutting-off of this supply. For example, a disperser as well as the methods of its activation and deactivation which refer to FIG. 3 can be used for this purpose.

When using the method shown in FIG. 4, at first during step 401 it should be checked whether gas injection into the coolant is required. If gas injection is not required, the standby mode is continued and the check of step 401 is periodically repeated or a command indicating the necessity of gas injection into the coolant is awaited. Step 401 can be performed by the module for control of the gas system and/or module for control of device intended for injection of gas into the coolant or a certain general control module.

In such case, if it was determined at step 401 that gas injection into the coolant is needed, then at step 402 the module for control of the gas system and/or module for control of device intended for injection of gas into the coolant can check whether the gas is supplied to the above-coolant space. If gas is not supplied, then the module for control of the gas system provides for gas supply to the above-coolant space at step 403, for example, by means of arrangement of one of configurations of the gas system at which the gas is supplied to the above-coolant space (examples of such configurations are described with reference to FIG. 2).

If it was determined at step 402 that the above-coolant space is supplied with gas (an additional check may also be conducted to verify the conformance of the supplied gas to the one that is required to be supplied to the coolant) or upon completion of step 403 the module for control of device intended for injection of gas into the coolant performs step 404 activating the device intended for injection of gas into the coolant.

Immediately after completion of step 404 or in the course of its execution, a timer, counting the specified time interval at step 405, is started. The timer can be included in the control system in the form of a separate module or be a part of other modules, for example, included in the module for control of device intended for injection of gas into the coolant. During the time period counted by the timer, the device intended for injection of gas into the coolant continues to inject gas into the coolant. The time interval set for the timer may be defined as time required for floating of gas bubbles to the surface of the coolant upon their injection to the coolant. In case the coolant circulation is not performed, this time can be quite short and defined as a distance from the surface of the coolant (depth) where holes for gas injection into the coolant of the device intended for injection of gas into the coolant are situated, divided by the rise rate of the gas bubbles. In case there is circulation of the coolant in the reactor, which is induced, for example, by circulation pump 110 shown in FIG. 1, and bubbles of the injected gas are entrained by the coolant (for this purpose, for example, in FIG. 1 disperser 112 is located near pump 110, and propeller 111 is rotating so that the coolant moves downward from the propeller), the gas bubbles may float up to the surface of the coolant after passing the whole circuit; in such case the time set by the timer may be equal to the length of the circulation circuit or the path of the bubbles prior to emergence, divided by the coolant circulation velocity.

On expiration of the time interval, counted by the timer, the module for control of device intended for injection of gas into the coolant may react in several ways. In the first instance, it may just stop the injection of gas into the coolant in order to prevent injection of contaminated gas irrespective of whether the above-coolant space is ventilated with pure gas or not. In the second instance, it may leave it as it is and continue to inject gas into the coolant in case the module for control of the gas system provides uninterruptible (continuous) ventilation of the above-coolant space with pure gas; in such case the gas injected to the coolant by means of the device intended for injection of gas into the coolant will be pure and the damaged caused by contaminated gas will be prevented. In the third instance, the module for control of device intended for injection of gas into the coolant may act in accordance with the method shown in FIG. 4, which is a combination of the first two methods.

At step 406 following the end of the counting by the timer of set time at step 405, the module for control of device intended for injection of gas into the coolant can check whether the gas is supplied to the above-coolant space (whether its ventilation is performed). If gas continues to be supplied, the device intended for injection of gas into the coolant may continue injection of the gas and the module for control of device intended for injection of gas into the coolant proceeds to step 405, i.e. the set time interval is counted again. In case the gas is not supplied, the module for control of device intended for injection of gas into the coolant deactivates the device intended for injection of gas into the coolant at step 407 and proceeds to step 401, and the same method is used again. Due to the method repeatability, its repetition and automatic control of gas injection into the coolant can be ensured, which allows to lessen the necessity for intervention of qualified personnel and, to a certain extent, exclude their participation in reactor plant operation control.

In the embodiment of the method shown in FIG. 4 the duration of uninterruptible injection of gas into the coolant is defined by the duration of gas supply to the above-coolant space. Depending on the mode of gas supply controlled by the module for control of the gas system, the whole system can operate in two modes. In case the module for control of the gas system provides for uninterruptible supply of gas to the above-coolant space for a long period of time (more than the time interval counted at step 405), gas injection into the coolant in accordance with the method shown in FIG. 4 will also be uninterruptible and its duration will be defined by the duration of gas supply from the gas system which may be set, for example, by an additional timer being a part of the module for control of the gas system, or a command sent from other devices or control board. In case the module for control of the gas system provides for supply of gas to the above-coolant space for a short period of time (less than the time interval counted at step 405), gas injection into the coolant in accordance with the method shown in FIG. 4 will be single-shot or noncontinuous (repeated) if gas injection to the coolant is still required after a single cycle performed in accordance with the method shown in FIG. 4 upon completion of step 407.

The method steps are preferably implemented in the shown and described sequence, but in some embodiments, whenever possible, the steps can be performed in a different sequence or simultaneously.

It should be noted that the interrelation between the operation of the module for control of the gas system and the module for control of device intended for injection of gas into the coolant may differ from the one described above with relation to the implementation of the method shown in FIG. 4. For example, gas supply to the above-coolant space and gas injection into the coolant may start and end jointly, simultaneously or with a certain time difference. Furthermore, where gas supply to the above-coolant space is mentioned in FIG. 4 and in description of the invention as a whole, it may be considered equivalent to removal of gas from the above-coolant space or simultaneous injection of gas into the space and removal of gas from the above-coolant space, as these modes can be performed simultaneously provided that there is no need, for example, for pressure increase in the above-coolant space. The main criterion is the provision of ventilation of the above-coolant space with the purpose of forcing out/replacement of contaminated gas with pure gas either continuously or at the time when the gas is not injected into the coolant.

Pure gas can be supplied to the space above the coolant from the gas source in order to be newly (for the first time) supplied gas each time. In another case, gas circulation is possible when pure gas supplied to the space above the coolant is obtained from the contaminated gas removed from the space above the coolant by filtration. For this purpose, it is possible to use the gas system configuration, forming a loop, which includes a filter and a pump (see above).

If method of creating a pressure in near-coolant space (and, hence, in device intended for injection of gas into the coolant) which exceeds the value of pressure in the coolant is used to inject gas into the coolant, the ventilation of the space above the coolant can be carried out either in intermittent mode, when after injection of gas into the coolant by the action of increased gas pressure within the allowed time interval, the gas pressure is reduced by bleeding into the discharge pipe and the space above the coolant is vented or in continuous mode, when gas is discharged from the space at a rate that prevents the pressure drop in order to maintain increased gas pressure in the near-coolant space. The gas outlet rate can be controlled by the size of the isolation valve bores or, for example, by the resistance to the gas flow created by the filter or other equipment. The gas outlet rate and ventilation of the space above the coolant can be determined by the state (configuration) of the gas system or by means of flowmeters for example.

The modules controlling the gas system and the device intended for injection of gas into the coolant can exchange information among themselves, for example in binary form, informing, for example, that the gas is supplied or not supplied, or that it is necessary to stop gas injection, or it is possible to start the gas supply (in some cases a signal can be given that directly prohibits the supply of gas or regulates the supply of power or sending of control signals to equipment controlled by another module). In another embodiment, the modules can exchange information about the equipment operation modes and the gas system state, changes in modes and parameters of operation and changes in the gas system operation and state—for example, about device activation or deactivation or the isolation valve opening or closing at a certain rate, which can be determined in instantaneous values or in the variation value for a specific, single, partial or total time interval. In some embodiments, the modules controlling the gas system and the device intended for injection of gas into the coolant can obtain information about the activation or deactivation (or degree of activity) of the equipment or valves controlled by adjacent modules (in particular, the modules controlling the device intended for injection of gas into the coolant and the gas system, respectively), directly from equipment or valves or from drivers or drives or cards that control this equipment or valves. Thus, for example, the module controlling the gas system and the device intended for injection of gas into the coolant can receive and/or exchange information about the disperser state (activated, deactivated and/or activation degree) and/or about the state of the equipment controlling or diagnosing the gas system, such as sensors, isolation valves (valves, breathers, etc.), pumps, etc. (state of this equipment can be expressed in the closed/open position, capacity, flow rate, activated/deactivated state and/or activation degree) directly from the disperser and/or gas system equipment (power supply terminals or sensors) and/or form boards/drivers/control cards of the specified equipment, as well as from the output of the module controlling the device intended for injection of gas into the coolant and the gas system that controls the equipment.

In some embodiments, the modules controlling the gas system and the device intended for injection of gas into the coolant may give a signal for light, sound or another indication showing that it is necessary to perform some of the operations required in accordance with the present invention. Such indication can be perceived by the personnel monitoring and controlling the reactor plant, and this personnel can carry out activation/deactivation of equipment and/or valves or issue commands on activation/deactivation of equipment and/or valves to the modules controlling the gas system and the device intended for injection of gas into the coolant, for example, on the basis of decisions taken after the perception of such indication.

The control system may contain a warning signal module designed so as to form a warning signal informing of the necessity to deactivate the disperser and/or termination of gas supply and/or supply/removal of gas to/from the space above the coolant, if operation in current mode may lead to equipment and coolant contamination.

The structure of the control device (control system) as per this invention may have other configurations which may be the alternatives obtained by means of addition, exclusion or replacement. The block scheme of control method shown in FIG. 4, as well as examples of implementation of the reactor plant, apparatus and devices in FIG. 1-3 are given for illustrations only and can limit the breadth of protection of this invention, defined in the claims. Any actions, objects, modules, elements, equipment and other attributes indicated in singular can also be considered as used if there are many of them in the plant or method, and on the opposite, if plurality is indicated, one object or action may be sufficient for the use of such attribute.

The control system can be automatic, i.e. the system can independently take and implement all decisions based on the data received and processed by the system. The advantage of such automatic method of gas injection in the coolant is that the necessity for the qualified personnel to take part in reactor plant control may be eliminated. However, it may cause the risk of reactor plant functioning conditions exceeding the permissible limits due to the closedness of the control cycle in case of unlimited positive feedback, wherein an attempt to control the undesired deviation of a parameter results in a greater deviation of the parameter in the undesired direction (this may occur due to imperfection of processing algorithms and equipment failures).

In another embodiment, the control system of gas injection into the coolant can be implemented with personnel involved in data processing and/or decision-making. This option requires involvement of highly qualified specialists. This will ensure the consideration of all possible parameters and exclude the reactor plant switch to hazardous or critical operation modes, as a human being, in contrast to an automatic device, is able to adaptively estimate the current situation and change action plans taking into account security and long-term operation issues.

To enable the personnel to receive data and interact with the control system, the reactor plant may have a control board equipped with indicating means such as light indicators (light panels, displays, information boards etc.), audio indicators (loud speakers, buzzers, alert systems etc.) and other, such as tactile displays. Furthermore, the control board can be equipped with input devices for requesting necessary information, testing and input of control commands. The input devices can be buttons, toggle switches, levers, keyboards, sensors, touch pads, trackballs, mouse, sensor panels and other input devices known in the prior art. Considering the variety of information equipment, the control board can be extended, for the personnel to use the board more conveniently. The equipment may include a rolling chair which, apart from operational comfort, ensures quick and easy access to remote parts of the control board and the operator can easily push off the current position and quickly get to the desired position due to progressive motion of the chair rolls.

However, it should be noted that both embodiments of the control system, the automatic one and the one involving personnel, have certain disadvantages. The manual control may have such a disadvantage as low speed of data processing and decision-making by personnel compared to the requirements of the reactor plant. On the other hand, the fully automated control system may be unsafe in case of failures or incomplete algorithms of data processing. As a result, the combined embodiment of the control system may be implemented, i.e. data processing and control are performed in automatic mode, but the data are displayed with the use of indicating means and, if any parameter exceeds the permissible limits (or approaches to the permissible limits) or upon any necessity the qualified personnel can adjust the operation of the automated control system or control it manually.

The modules of the control system can be executed in hardware on the basis of discrete electronic components, integrated microcircuits, processors, assemblies, racks etc. The control system can be analog, digital or combined. Modules which are electrically connected to equipment located in the reactor or in the control board and which control its operation or process the data may include the converters of voltage, current, frequency, analog signals to digital ones and contrariwise, drivers, sources of current or voltage and control elements. All these elements and modules can be located on one or several mounting plates, can share one board or component or be separated accordingly, or can be executed and installed without the use of mounting plates.

The control system modules may also be executed in software. For this purpose, integrated microcircuits with programmable logic, controllers, processors and computers can be used as hardware; while software will include programs with commands and codes executed by means of the indicated microcircuits, controllers, processors, computers etc. connected to the reactor devices and equipment. The programs shall be stored in memory units which can be executed in various forms known in the prior art and can be data carriers read by computer: read-only memory, hard drives and floppy disks, flash-drives, optical disks, frame memory etc. The programs may include chains of codes or commands for implementation of method and algorithms as per this invention, in whole or in part. Microcircuits, controllers, processors and computers can be connected to the input/output devices which may be located separately or be included into the control board. Separate modules of the control system can be software modules or be combined into one or several programs as well as into one or several software packages or elements.

The control system and its modules may be executed as both hardware and software, i.e. part of the modules or all the modules may be executed in hardware, and part of the modules or control devices may be made as software. In the preferable embodiment, the control modules of reactor equipment (gas system, device intended for injection of gas into the coolant) and the modules for conversion of sensors can be made in hardware, and the modules for processing of data and commands, information display and control of processing parameters (such as threshold and permissible values) can be made as software on the basis of a computer, processor or controller. Additionally, specialized microcircuits can be produced. Such circuits shall contain all the necessary hardware elements with programs or parameters of data processing to be downloaded into these circuits.

In the preferable embodiment, all electronic and other elements and components shall be made radiation-resistant to allow for operation of components and operability of the system in the whole as part of a nuclear reactor plant, which may be a source of ionizing radiation, and to preserve the capability of reactor operation control even in accident conditions and prevent possible adverse effects, thereby ensuring the enhanced safety and long operating life.

The invention claimed is:

1. A nuclear reactor plant including:
   a reactor;
   a coolant in the reactor;
   a gas system connected to the reactor and adapted to provide a gas supply to and gas removal from space above the coolant;
   a device for injection of gas into the coolant, the device installed partially in the coolant and partially in the space above the coolant, and the device adapted to supply gas from the space above the coolant to the coolant, the gas system and device configured to carry out steps including:
   supplying gas to be injected into the coolant from the gas system to the space above the coolant;
   injecting gas into the coolant by maintaining the gas pressure higher than coolant pressure in the device; and
   injecting gas into the gas system from the space above the coolant.

2. The nuclear reactor plant according to claim 1 comprising piping, gas filter and a pump, the piping connected into a loop, the loop having an end adapted to receive gas from the space above the coolant of the reactor and another end adapted to supply gas to the space above the coolant.

3. The nuclear plant of claim 1 further comprising
a controller configured to control a gas supply to the space above the coolant of the reactor and gas removal from the space above the coolant of the reactor; and
a controller configured to control the device for injection of gas into the coolant and gas injection into the coolant from the space above the coolant.

* * * * *